(12) United States Patent
Suchy et al.

(10) Patent No.: US 9,951,698 B2
(45) Date of Patent: Apr. 24, 2018

(54) METHOD OF ESTIMATING THE BOOST CAPABILITY OF A TURBOCHARGED INTERNAL COMBUSTION ENGINE

(71) Applicant: GM GLOBAL TECHNOLOGY OPERATIONS LLC, Detroit, MI (US)

(72) Inventors: Martin Suchy, Ruesselsheim (DE); Joerg Bernards, Katzenelnbogen (DE); Alexander Klein, Weiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 14/514,170

(22) Filed: Oct. 14, 2014

(65) Prior Publication Data
US 2015/0101578 A1 Apr. 16, 2015

(30) Foreign Application Priority Data
Oct. 14, 2013 (GB) .................................. 1318132.6

(51) Int. Cl.
*F02D 41/00* (2006.01)
*F02M 26/05* (2016.01)
(Continued)

(52) U.S. Cl.
CPC ..... *F02D 41/0007* (2013.01); *F02D 41/1446* (2013.01); *F02M 26/05* (2016.02);
(Continued)

(58) Field of Classification Search
CPC ............. F02D 41/0007; F02D 41/1446; F02D 41/1445; F02D 2041/1433;
(Continued)

(56) References Cited

U.S. PATENT DOCUMENTS 9,506,397 B2 * 11/2016 Karnik .................... F02B 37/18
2005/0172628 A1 8/2005 Fukasawa et al.
(Continued)

FOREIGN PATENT DOCUMENTS

GB 2347235 A 8/2000
GB 2386689 A 9/2003
(Continued)

*Primary Examiner* — David Hamaoui
(74) *Attorney, Agent, or Firm* — Lorenz & Kopf LLP

(57) ABSTRACT

A method of estimating a boost pressure of a turbocharger is disclosed. A throttle body temperature is estimated as a function of engine operating parameters. An intake air mass flow and an exhaust mass flow are estimated as a function of the throttle body temperature. A turbine inlet pressure and a turbine outlet pressure are estimated as a function of engine operating parameters. A turbine speed is estimated as a function of the intake air mass flow, exhaust mass flow and turbine inlet and outlet pressure. The boost pressure is estimated as a function of the turbine speed. Estimation of the maximum boost pressure of a turbocharged internal combustion engine is performed method cyclically as follows: estimating a throttle temperature, estimating an air mass flow and an exhaust mass flow, estimating a turbine inlet pressure and a turbine outlet pressure, estimating a turbine speed, and estimating the maximum boost pressure.

17 Claims, 3 Drawing Sheets

(51) Int. Cl.
   *F02D 41/14*   (2006.01)
   *F02B 37/12*   (2006.01)

(52) U.S. Cl.
   CPC .... *F02B 2037/122* (2013.01); *F02D 41/1445* (2013.01); *F02D 2041/1433* (2013.01); *F02D 2200/0402* (2013.01); *F02D 2200/0408* (2013.01); *Y02T 10/144* (2013.01)

(58) Field of Classification Search
   CPC .... F02D 2200/0408; F02D 2200/0402; F02M 26/05; Y02T 10/144; F02B 2037/122
   See application file for complete search history.

(56) References Cited

U.S. PATENT DOCUMENTS

| | | | |
|---|---|---|---|
| 2006/0196182 A1 | 9/2006 | Kimoto et al. | |
| 2006/0207253 A1* | 9/2006 | Sumser | F02B 37/12 60/602 |
| 2008/0077304 A1* | 3/2008 | Suzuki | F02B 37/127 701/102 |

FOREIGN PATENT DOCUMENTS

| | | |
|---|---|---|
| GB | 2386701 A1 | 9/2003 |
| GB | 2473280 A | 3/2011 |
| JP | 2005036672 A * | 2/2005 |

* cited by examiner

METHOD OF ESTIMATING THE BOOST CAPABILITY OF A TURBOCHARGED INTERNAL COMBUSTION ENGINE

CROSS REFERENCE TO RELATED APPLICATION

This application claims priority to British Patent Application No. 1318132.6 filed Oct. 14, 2013, which is incorporated herein by reference in its entirety.

TECHNICAL FIELD

The technical field relates to a method of estimating the boost capability of a turbocharged internal combustion engine. The method is suitable for both diesel and gasoline internal combustion engines.

BACKGROUND

As known, the majority of internal combustion engines are turbocharged. A turbocharger is a forced induction device used to allow more power to be produced for an engine of a given size. The benefit of a turbocharger (or simply turbo) is that it compresses a greater mass of intake air into the combustion chamber, thereby resulting in increased power and/or efficiency. Turbochargers are commonly used on truck, car, train and construction equipment engines. They are popularly used with Otto cycle and Diesel cycle internal combustion engines and have also been found useful in automotive fuel cells.

The boost pressure, which is the maximum pressure the compressed intake air will get under the different engine operating conditions, is a key parameter, since that its accurate estimation avoids integrator wind up of torque and/or boost controller. The integrator is necessary to avoid deviations from boost or respectively torque set-point. If there is an error the integrator winds up until the error is zero. These values are considered in the adaptation. For example, more boost pressure is needed to get the desired torque at high altitude. The boost pressure the compressor is able to provide depends on the energy provided to the turbine. If there is no energy at the turbine, the compressor is not able to provide more boost pressure and the error keeps increasing. In that case the integrator would wind up and the adaptation would learn wrong values. Using these values going back to sea level would lead to over boost.

Furthermore, the accurate estimation of the boost pressure optimizes the interaction between boost pressure and torque control and provides reliable maximum torque estimation considering the ambient conditions and the enthalpy at the turbine.

Finally, the accurate estimation of the boost pressure optimizes the down shift behavior for both automatic and manual transmissions. In fact, being possible to estimate the boost pressure for current conditions and for different engine speeds, the algorithm is calculating the energy provided to the turbine and based on that, the maximum boost pressure. If the maximum boost pressure is lower than the desired boost pressure, the mass flow to the turbine has to be increased, by increasing the engine speed done by a down shift. For automatic transmission, it is also important to know the maximum available torque to perform an upshift. Therefore it is also possible to avoid "hunting" or "toggling" between several gears.

Up to now, no method of estimating the boost pressure is available. Therefore a need exists for a method of estimating the boost pressure the turbocharger can provide to the engine, with a reliable accuracy and without a very complex and time consuming routine.

SUMMARY

The present disclosure provides a method and apparatus of estimating a boost pressure, under all possible engine operating conditions. The boost pressure estimate may be embodied in a method, by an apparatus, by an engine, by a computer program and computer program product.

An embodiment of the disclosure provides a method of estimating a boost pressure of a turbocharged internal combustion engine. The method includes: estimating a throttle body temperature as a function of engine operating parameters; estimating an intake air mass flow and an exhaust mass flow as a function of the throttle body temperature; estimating a turbine inlet pressure and a turbine outlet pressure as a function of engine operating parameters; estimating a turbine speed as a function of the intake air mass flow, exhaust mass flow and turbine inlet and outlet pressure; and estimating the boost pressure as a function of the turbine speed.

Consequently, an apparatus is disclosed for performing the method of estimating a boost pressure of a turbocharged internal combustion engine. The apparatus includes: means for estimating a throttle body temperature as a function of engine operating parameters; means for estimating an intake air mass flow and an exhaust mass flow as a function of the throttle body temperature; means for estimating a turbine inlet pressure and a turbine outlet pressure as a function of engine operating parameters; means for estimating a turbine speed as a function of the intake air mass flow, exhaust mass flow and turbine inlet and outlet pressure; and means for estimating the boost pressure as a function of the turbine speed.

An advantage of these embodiments is that the estimation of the boost pressure, under all ambient conditions, allows a prediction of the maximum torque the engine is able to provide.

According to another embodiment, the method steps are performed cyclically. Consequently, the apparatus is configured to cyclically perform the method steps. An advantage of this embodiment is that after at least a second cycle the estimation is accurate enough, therefore the choice of the loop number depends on a desired trade-off accuracy vs. computation time.

According to a further embodiment, the method steps are performed exactly four times. Consequently, the apparatus is configured to perform the method steps exactly four times. An advantage of this embodiment is that a very good trade-off accuracy vs. computation time is obtained, performing the method steps exactly four times. In particular, in this case the computation time is about 100 ms, which is an acceptable value.

According to a still further embodiment, an engine operating parameters is a predicted engine speed, the predicted engine speed being calculated by the following equation:

$$n_{i+1} = n_i + \frac{(n_i - n_{i-1})}{(t_i - t_{i-1})}$$

Consequently, the apparatus is configured to operate if an engine operating parameters is a predicted engine speed, the predicted engine speed being calculated by the following equation:

$$n_{i+1} = n_i + \frac{(n_i - n_{i-1})}{(t_i - t_{i-1})}$$

An advantage of this embodiment is that the predicted engine speed is a physical parameter, which is needed to estimate the air and the exhaust mass flow.

According to still another embodiment, another engine operating parameters is a cooling capacity factor, the cooling capacity factor being a function of further engine operating parameters and exactly a current boost pressure, a current turbocharger inlet pressure, a current compressor inlet temperature and a current inlet manifold temperature. Consequently, the apparatus is configured to operate if another engine operating parameters is a cooling capacity factor, the cooling capacity factor being a function of further engine operating parameters and exactly a current boost pressure, a current turbocharger inlet pressure, a current compressor inlet temperature and a current inlet manifold temperature. An advantage of this embodiment is that the cooling capacity factor is a physical parameter, which is needed to estimate the throttle body temperature.

According to another embodiment, the throttle body temperature is a function of the current boost pressure, the current turbocharger inlet pressure, the current compressor inlet temperature and the cooling capacity factor. Consequently, the means for estimating a throttle body temperature are configured to estimate the throttle body temperature as a function of the current boost pressure, the current turbocharger inlet pressure, the current compressor inlet temperature and the cooling capacity factor. An advantage of this embodiment is that the throttle body temperature is a physical parameter, which is needed to estimate the air mass flow.

According to a further embodiment, the air mass flow and exhaust mass flow are estimated as a function of the predicted engine speed, the current boost pressure, a volumetric efficiency, intake actuator states, a current ambient air pressure and the estimated throttle body temperature. Consequently, the means for estimating an air mass flow and an exhaust mass flow are configured to estimate them as a function of the predicted engine speed, the current boost pressure, a volumetric efficiency, intake actuator states, a current ambient air pressure and the estimated throttle body temperature. An advantage of this embodiment is that the estimated air mass flow and exhaust mass flow are physical parameters, which are needed to estimate turbine inlet and outlet pressure, turbine speed and maximum boost pressure.

According to a still further embodiment, the turbine inlet pressure and the turbine outlet pressure are estimated as a function of the air mass flow and the exhaust mass flow. Consequently, the means for estimating a turbine inlet pressure and a turbine outlet pressure are configured to estimate them as a function of the air mass flow and the exhaust mass flow. An advantage of this embodiment is that the estimated turbine inlet pressure and turbine outlet pressure are physical parameters, which are needed to estimate the turbine speed.

According to still another embodiment, the turbine speed is estimated as a function of the exhaust mass flow, the turbine inlet pressure, the turbine outlet pressure and a current turbine inlet temperature. Consequently, the means for estimating a turbine speed are configured to estimate the turbine speed as a function of the exhaust mass flow, the turbine inlet pressure, the turbine outlet pressure and a current turbine inlet temperature. An advantage of this embodiment is that the turbine speed is also a physical parameter which is needed to estimate the maximum boost pressure.

According to another embodiment the boost pressure is estimated as a function of the air mass flow, the current turbine inlet temperature, the current turbocharger inlet pressure and the turbine speed. Consequently, the means for estimating a boost pressure are configured to estimate the boost pressure as a function of the air mass flow, the current turbine inlet temperature, the current turbocharger inlet pressure and the turbine speed. An advantage of this embodiment is that the maximum boost pressure is needed to perform the next method cycle or, if estimated at the end of the last method cycle, is the final result of the present method.

Another embodiment of the disclosure provides an internal combustion engine including a turbocharger, wherein a maximum boost pressure of the turbocharged engine is estimated by a method according to any of the previous embodiments. The method according to one of its aspects can be carried out with the help of a computer program including a program-code for carrying out all the steps of the method described above, and in the form of computer program product including the computer program. The computer program product can be embedded in a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
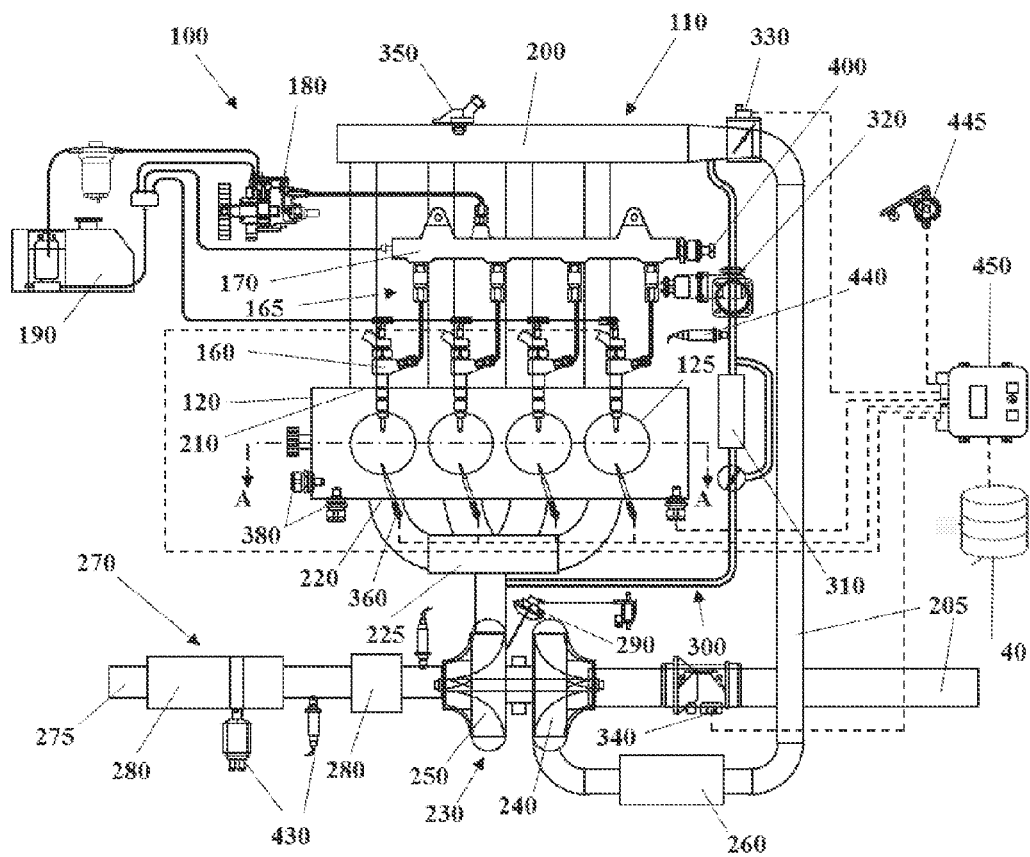
FIG. 1 shows an automotive system.
Figure 2:
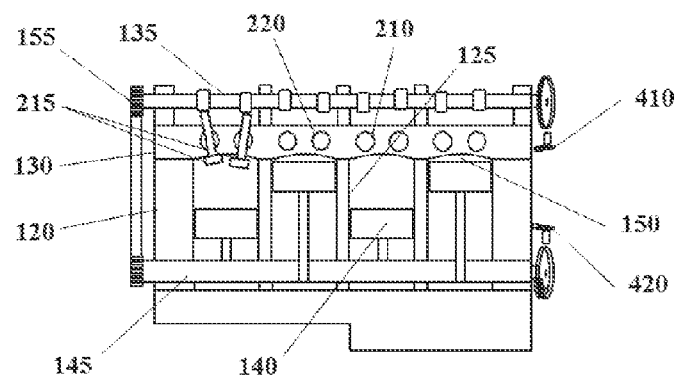
FIG. 2 is a section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps, hydrocarbon adsorbers, selective catalytic reduction (SCR) systems. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the waste gate actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
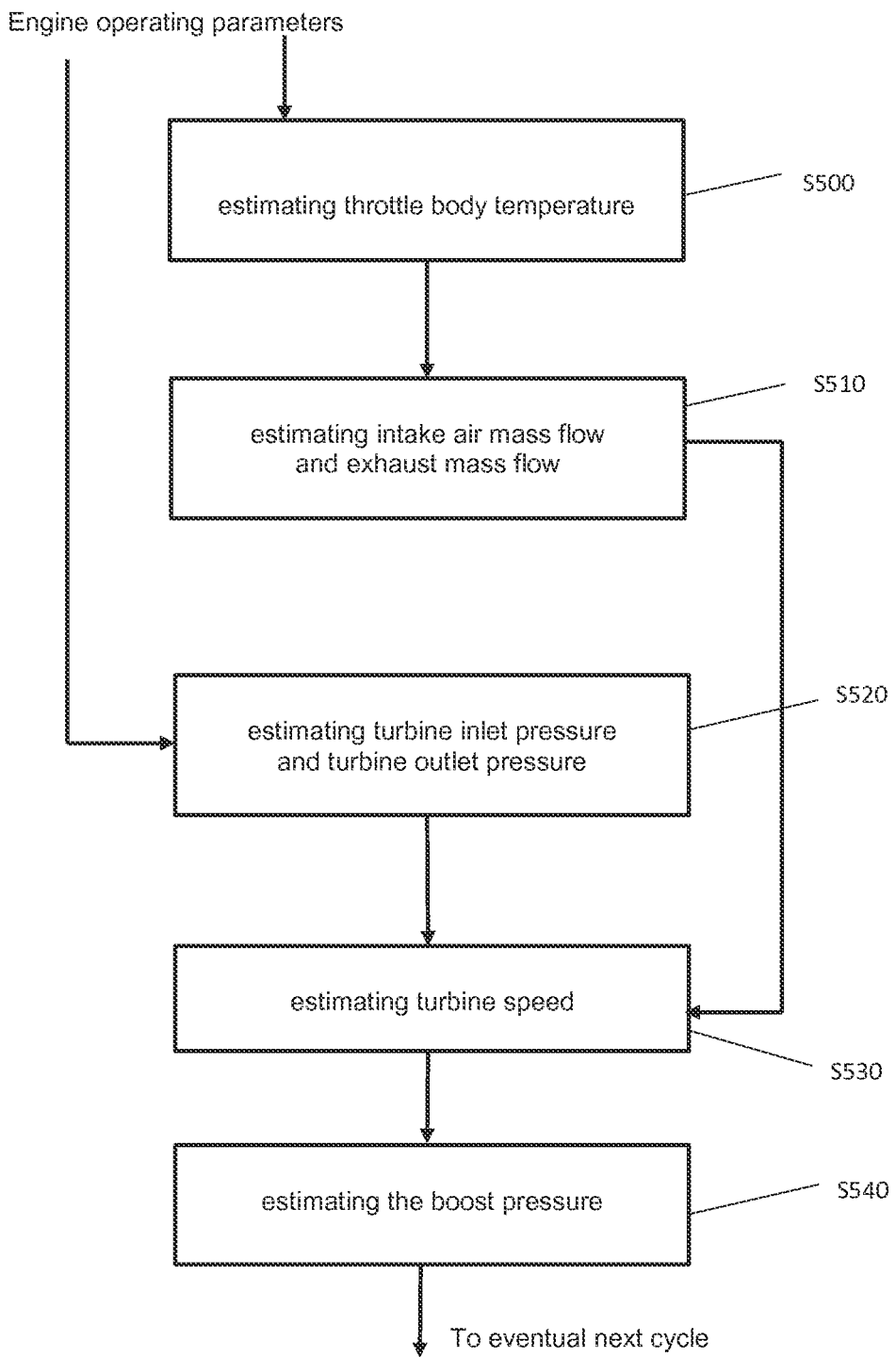
FIG. 3 is a flowchart of the method according to one embodiment of the present disclosure.

FIG. 3 is a flowchart of the method according to one embodiment of the present disclosure. The method is suitable for turbocharged internal combustion engines, both diesel and gasoline ones, and is aimed to evaluate a boost pressure in all engine operating conditions. As known, the engine boost pressure is a very important performance of the engine. It is related to the maximum torque the engine is able to perform and therefore is a key parameter for the engine management system. The method is based on a sequence of steps, which can be cyclically repeated in order to get a stable, in other words, a saturated boost pressure the engine is able to reach. Such steps are, in sequence, the estimation S500 of a throttle body temperature as a function of current engine operating conditions, the estimation S510 of an intake air mass flow and an exhaust mass flow as a function of the throttle body temperature, the estimation S520 of a turbine inlet pressure and a turbine outlet pressure as a function of current engine operating conditions, the estimation S530 of a turbine speed as a function of the intake air mass flow, exhaust mass flow and turbine inlet and outlet pressure and finally the estimation S540 of the boost pressure as a function of the turbine speed.

Figure 4:
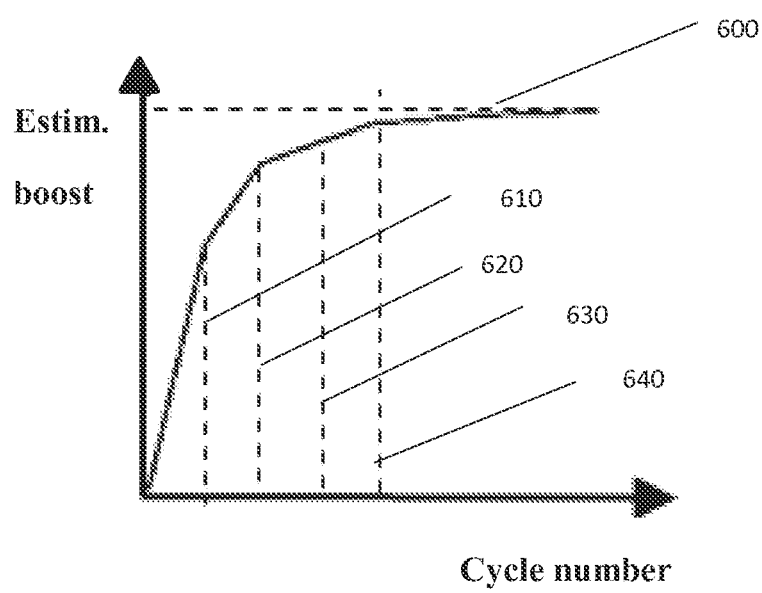
FIG. 4 shows the saturation effect of the estimated boost pressure, by using the method of FIG. 3.

FIG. 4 shows the saturation effect of the estimated boost pressure. The boost pressure behavior 600 is shown as a function of the loop numbers or cycles, the method steps are repeated. In the example of FIG. 4, four cycles are presented and the related maximum estimated pressure after each cycle is respectively referenced with 610, 620, 630, 640. As can be observed, the boost pressure value change from cycle to cycle, but the tendency is that such boost pressure is saturated after few cycles.

According to an embodiment of the present disclosure, the method steps should be repeated cyclically, at least twice: only one loop would give a really underestimated value of the boost pressure (compare pressure value 610 with pressure value 640, for example). After the second loop, the estimation is sufficiently accurate; therefore the choice of the loop number depends on a desired trade-off accuracy vs. computation time.

A preferred embodiment of the present disclosure, that is to say an effective compromise of accuracy vs. computation time, is to perform the method steps exactly four times, which would take about 100 ms as computation time.

The first cycle of the method steps (but the same description can be used for the following cycles) is based on current engine operating parameters, such as predicted engine speed, ambient air pressure, turbocharger inlet temperature, etc. Then, such values are frozen and will be used for the current cycle and for the following ones. In particular, the predicted engine speed is estimated considering an engine speed gradient over two consecutive method steps cycles. As input parameters, the current engine speed and the amount of calculation loops (e.g. 4 loops) shall be taken into account. A simplified equation to predict the engine speed can be the following:

$$n_{i+1} = n_i + \frac{(n_i - n_{i-1})}{(t_i - t_{i-1})}$$

Where:
  n=engine speed
  t=time
  i=cycle number

A further input parameter is the current boost pressure value, which will be updated with the estimated boost pressure value coming from the previous loop. The current boost pressure is used to evaluate a further input parameter, a cooling capacity factor. This is done to consider the cooling impact of the intercooler. In detail, the cooling capacity factor depends on the intercooler geometry and is also a function of the current boost pressure, the current turbocharger inlet pressure, the current compressor inlet temperature and the current inlet manifold temperature and can be calculated by applying well known thermodynamic and heat transfer equations.

After having estimated the input parameters, the method estimates S500 the throttle temperature as a function of the current boost pressure, the current turbocharger inlet pressure, the current compressor inlet temperature and the cooling capacity. More in detail, also applying thermodynamic and heat transfer equations, the algorithm calculates the compressor outlet temperature by using the compressor inlet temperature, the turbocharger inlet pressure and the current boost; then it calculates the throttle inlet temperature considering the cooling capacity factor of the intercooler, in other words the heat exchange in the intercooler.

Further, the air mass flow and the exhaust mass flow are estimated S510 as a function of the predicted engine speed, the current boost pressure, a volumetric efficiency, intake actuator states, a current ambient air pressure and the estimated throttle inlet temperature. The related algorithm calculates the estimated air per cylinder by using the current boost, the estimated throttle inlet temperature and the volumetric efficiency. In turn, the volumetric efficiency is calculated depending on the engine operating zone, the engine speed, the cam phaser positions and the intake actuator states (for example, the actuators for cylinder deactivation or, in case of natural aspirated engines, for the variable intake manifold). Considering the current engine speed and the estimated air per cylinder, the air mass flow is estimated. Finally, considering the fuel-air equivalence ratio (EQR) for full load, the exhaust mass flow is estimated as well.

Following, always applying the well-known thermodynamics equations and empirical data, the method estimates S520 the turbine inlet pressure and the turbine outlet pressure as a function of the air mass flow and the exhaust mass flow. More in detail, the estimated exhaust mass flow is used as input parameter in available tables giving as output parameter the pressure drop for a fully closed waste gate. Then, the pressure before the turbine is corrected with the ambient air pressure.

After this step, the turbine speed is estimated as a function of the exhaust mass flow, the turbine inlet pressure, the turbine outlet pressure and the current turbine inlet temperature. In particular, the estimated exhaust mass flow is corrected by the current turbine inlet temperature and is used as first input of an available map of turbine speed. Second input is the ratio between turbine inlet and turbine outlet pressure. The related algorithm also provides a turbine speed limit to protect the turbocharger against the well-known over-speed phenomenon.

Finally, the boost pressure is estimated as a function of the air mass flow, the current turbine inlet temperature, the current turbocharger inlet pressure and the turbine speed. In detail: the estimated air mass flow is corrected considering the compressor inlet temperature and the turbocharger inlet pressure; then the corrected estimated air mass flow and the estimated turbine speed are inputs of a reverse look up table of an existing compressor speed map; output of the reverse look up map is the estimated compressor pressure ratio which is multiplied by the current compressor inlet pressure to get the estimated boost pressure.

Together with the frozen values of the engine parameters, such estimated boost pressure is used as input for the next cycle of the method, until when all predetermined cycles have been performed. At the end, the last value of the estimated boost pressure will be the final output of the present method.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodi-

The invention claimed is:

1. A method of controlling a boost pressure of a turbocharger for an internal combustion engine comprising:
   estimating a throttle body temperature as a function of at least one engine operating parameter, the at least one engine operating parameter including a predicted engine speed calculated as follows:

$n_{i+1}=n_i+(n_i-n_{i-1})/(t_i-t_{i-1})$ where: n=engine speed, t=time, and i=cycle number;
   estimating an intake air mass flow and an exhaust mass flow as a function of said throttle body temperature;
   estimating a turbine inlet pressure and a turbine outlet pressure as a function of at least one engine operating parameter;
   estimating a turbine speed as a function of said intake air mass flow, exhaust mass flow and turbine inlet and outlet pressure;
   estimating a boost pressure as a function of said turbine speed; and
   generating a control signal based on said estimated boost pressure to control the turbocharger; and
   controlling the turbocharger using the control signal to adjust the boost pressure for generating the estimated boost pressure.

2. The method according to claim 1, wherein the method is performed cyclically.

3. The method according to claim 2, wherein the method is performed exactly four times.

4. The method according to claim 1, wherein the at least one engine operating parameter includes a cooling capacity factor estimated as a function of at least one engine operating parameter selected from the group consisting of a current boost pressure, a current turbocharger inlet pressure, a current compressor inlet temperature and a current inlet manifold temperature.

5. The method according to claim 4, wherein the at least one engine operating parameter includes the cooling capacity factor estimated as a function of a current boost pressure, a current turbocharger inlet pressure, a current compressor inlet temperature and a current inlet manifold temperature.

6. The method according to claim 1, wherein said throttle body temperature is estimated as a function of a current boost pressure, a current turbocharger inlet pressure, a current compressor inlet temperature and a cooling capacity factor.

7. The method according to claim 1, wherein said air mass flow and exhaust mass flow are estimated as a function of the predicted engine speed, a current boost pressure, a volumetric efficiency, an intake actuator state, a current ambient air pressure and the estimated throttle body temperature.

8. The method according to claim 1, wherein said turbine inlet pressure and said turbine outlet pressure are estimated as a function of the intake air mass flow and the exhaust mass flow.

9. The method according to claim 1, wherein said turbine speed is estimated as a function of the exhaust mass flow, the turbine inlet pressure, the turbine outlet pressure and a current turbine inlet temperature.

10. The method according to claim 1, wherein said boost pressure is estimated as a function of the air mass flow, the current turbine inlet temperature, the current turbocharger inlet pressure and the turbine speed.

11. An internal combustion engine comprising a turbocharger wherein a maximum boost pressure of the turbocharger is estimated by the method according to claim 1.

12. A non-transitory computer program comprising a computer-code operable with a processor for performing the method according to claim 1.

13. A computer program product on which the non-transitory computer program according to claim 12 is stored.

14. A method of controlling a boost pressure of a turbocharger for an internal combustion engine comprising:
   estimating a throttle body temperature, in a processor, as a function of a current boost pressure, a current turbocharger inlet pressure, a current compressor inlet temperature and a cooling capacity factor;
   estimating an intake air mass flow and an exhaust mass flow, in the processor, as a function of said throttle body temperature;
   estimating a turbine inlet pressure and a turbine outlet pressure, in the processor, as a function of at least one engine operating parameter;
   estimating a turbine speed, in the processor, as a function of said intake air mass flow, exhaust mass flow and turbine inlet and outlet pressure;
   estimating a boost pressure, in the processor, as a function of said turbine speed;
   generating a control signal based on said estimated boost pressure, in the processor, to control the turbocharger; and
   controlling the turbocharger using the control signal to adjust the boost pressure for generating the estimated boost pressure.

15. A control apparatus for an internal combustion engine comprising an electronic control unit and a computer program product stored in non-transitory computer readable medium having a computer-code operable with the electronic control unit to execute the following steps:
   estimate a throttle body temperature as a function of at least one engine operating parameter;
   estimate an intake air mass flow and an exhaust mass flow as a function of said throttle body temperature, a predicted engine speed, a current boost pressure, a volumetric efficiency, an intake actuator state, a current ambient air pressure and the estimated throttle body temperature;
   estimate a turbine inlet pressure and a turbine outlet pressure as a function of at least one engine operating parameter;
   estimate a turbine speed as a function of said intake air mass flow, exhaust mass flow and turbine inlet and outlet pressure;
   estimate a boost pressure as a function of said turbine speed;
   generate a control signal based on said estimated boost pressure to control the turbocharger; and
   control the turbocharger using the control signal to adjust the boost pressure for generating the estimated boost pressure.

16. The control apparatus of claim 15, wherein the at least one engine operating parameter is a predicted engine speed calculated as follows:

$n_{i+1}=n_i+(n_i-n_{i-1})/(t_i-t_{i-1})$ where: n=engine speed, t=time, and i=cycle number.

17. The control apparatus of claim 15, wherein said throttle body temperature is estimated as a function of a current boost pressure, a current turbocharger inlet pressure, a current compressor inlet temperature and a cooling capacity factor.

* * * * *